United States Patent [19]
Londono et al.

[11] Patent Number: 5,260,828
[45] Date of Patent: Nov. 9, 1993

[54] METHODS AND MEANS FOR REDUCING TEMPERATURE-INDUCED VARIATIONS IN LENSES AND LENS DEVICES

[75] Inventors: Carmina Londono, Arlington; William T. Plummer, Concord, both of Mass.

[73] Assignee: Polaroid Corporation, Cambridge, Mass.

[21] Appl. No.: 858,522

[22] Filed: Mar. 27, 1992

[51] Int. Cl.$^5$ .......................... G02B 3/02; G02B 27/44
[52] U.S. Cl. .................................... 359/565; 359/569; 359/708; 359/742
[58] Field of Search ............... 359/355, 356, 357, 565, 359/566, 569, 742, 820, 708

[56] References Cited

U.S. PATENT DOCUMENTS

| | | | |
|---|---|---|---|
| 4,210,391 | 7/1980 | Cohen | 359/565 |
| 4,637,697 | 1/1987 | Freeman | 359/565 |
| 5,017,000 | 5/1991 | Cohen | 359/565 |
| 5,044,706 | 9/1991 | Chen | 359/357 |
| 5,100,226 | 3/1992 | Freeman | 359/565 |
| 5,116,111 | 5/1992 | Simpson et al. | 359/565 |
| 5,121,979 | 6/1992 | Cohen | 359/569 |
| 5,148,317 | 9/1992 | Foresi | 359/566 |
| 5,151,823 | 9/1992 | Chen | 359/566 |
| 5,161,040 | 11/1992 | Yokoyama et al. | 359/565 |
| 5,161,057 | 11/1992 | Johnson | 359/565 |

OTHER PUBLICATIONS

Stone et al., "Hybrid Diffractive-Refractive Lenses and Achromats," *Applied Optics*, vol. 27, No. 14, Jul. 15, 1988, pp. 2960 to 2971.
"Archromatic Tiplet Using Holographic Optical Elements"—W. C. Sweatt, Applied Optics, vol. 16, No. 5, May 1977, pp. 1390-1391.
"Optical And Physical Parameters of Plexiglas 55 and Lexan"—R. M. Waxler, D. Horowitz and A. Feldman, Applied Optics, vol. 18, No. 1, Jan. 1, 1979, pp. 101-104.
"Thin Sheet Plastic Fresnel Lenses of High Aperture"—O. E. Miller, J. H. McLeod and W. T. Sherwood, Journal of the Optical Society of America, vol. 41, No. 11, Nov. 1951, pp. 807-815.
"Physical Optics"—R. W. Wood, Optical Society of America, Washington, D.C., 3rd Ed., pp. 32-39, pp. 252-253.
"The Kinoform: A New Wavefront Reconstruction Device"—L. B. Lesem, P. M. Hirsch, J. A. Jordan, Jr., IBM J. Res. Develop., Mar. 1969, pp. 150-155.
"Production of Kinoforms By Single Point Diamond Machining"—P. P. Clark and C. Londono, Optics News, vol. 15, No. 12, pp. 39-40, Dec. 1989.
"Control of Thermal Focus Shift In Plastic-Glass Lenses"—K. Straw, SPIE, vol. 237, pp. 386-391, 1980.
"Thermal Effects In Optical Systems"—T. H. Jamieson, Optical Engineering, vol. 20, No. 2, pp. 156-160, Mar./Apr. 1981.

*Primary Examiner*—Martin Lerner
*Attorney, Agent, or Firm*—Francis J. Caufield

[57] ABSTRACT

A lens composed of a single material and having at least one refractive surface on one face and a kinoform on the other face. The purely refractive between the surfaces varies dimensionally and in refractive index in response to temperature changes and thereby changes a characteristic, such as back focal length, of the lens while the kinoform varies differently in response to the same temperature changes. The kinoform power is sufficient to vary the temperature induced characteristic changes of the lens in an opposing sense at a given wavelength and in an amount sufficient to athermalize the optical device. In one embodiment the kinoform power compensates for the combined temperature-induced effects upon the refractive portion and any mount that supports the lens.

35 Claims, 9 Drawing Sheets

METHODS AND MEANS FOR REDUCING TEMPERATURE-INDUCED VARIATIONS IN LENSES AND LENS DEVICES

BACKGROUND OF THE INVENTION

This invention relates primarily to lenses composed of a single material and to systems employing such lenses. More particularly, it relates to designs for such lenses which, when used singly or as part of a system, have the property that certain of their optical characteristics remain relatively unchanged with changes in temperature or change in a controlled predetermined way.

Correction of lens aberrations normally requires the use of multiple component lenses even when thermal effects are not a dominant factor. However, there have been some simple designs reported for use over modest temperature ranges where just portions of a single element lens can correct a specific aberration. For example, chromatic aberrations have been corrected by using a single element lens with a conventional refractive or "bulk" portion, and a shallow surface diffractive portion. Here, the diffractive portion reduces the chromatic aberrations introduced by the bulk portion. (W. C. Sweatt, Applied Optics, Vol. 16, No. 5, May (1977).

However, if thermal effects cannot be ignored because they affect performance due to unacceptable changes due to thermal changes in material or geometric properties of a lens, designs for compensating for them i.e., athermalized designs can of necessity become quite complicated. For example, plastic and glass optical materials may change enough so that corresponding changes in focal length or the state of correction of a lens can become intolerable. This is so in part because these materials, especially plastic exhibit large changes in refractive index with temperature changes.

Designers have made lens systems less sensitive to these temperature effects by exploiting the differences in which changes in refractive index or geometry occur in one or more elements to compensate for those introduced by others. This approach, when properly implemented, can result in a thermally balanced arrangement. For example, if it were important to maintain back focal length in a multiple component lens constant over a given temperature, a designer could adjust the properties of individual elements of the lens in such a way the thermally induced increases to back focal length were balanced or offset by the decreases in others. This could be done by control of the thermal properties of lens element geometry or index, or both.

Such compensation may be important, for example, in arrangements used to focus laser beams onto the surfaces of compact disks.

While such a solution suffices for lenses having multiple components, it is unsuitable for systems using a single lens element made of one material. Hence, there continues to be a need for simple and uncomplicated lens elements or components by which thermal effects can be usefully controlled, and it is a primary object of this invention to provide such.

Another object of the invention is to provide a single-material lens with selected optical characteristics that vary with temperature in a selected manner, for example, in a manner which maintains an optical characteristic substantially constant at a given wavelength.

Another object is to supply an athermalized single-material lens with substantially constant focal length, spherical aberration correction, coma correction, or any combination of these.

Yet another object of the invention is to provide a single-material lens that compensates not only for temperature-induced optical variations of the lens itself but also the temperature-induced variations in the structure spacing the lens from an object or a sensor at or near a specific dominant wavelength.

Other objects and advantages of the invention will become evident from the following detailed description when read in light of the accompanying drawings.

SUMMARY OF THE INVENTION

The invention is based upon the recognition that a kinoform produces a temperature-induced optical response different from that of the bulk material in which it may be formed and that the kinoform's temperature-induced optical response can be used in opposition to that of a refractive lens formed of the bulk material, even in cases where kinoform is itself formed of the same material.

According to a feature of the invention, a lens comprised of a single optical material has a refractive or bulk portion having a given optical characteristic at one dominant wavelength that shifts in one sense in response to a temperature change and includes a "kinoform", or diffractive portion that responds to the same temperature change at the same wavelength by shifting the lens characteristics in a sense opposite to that of the bulk portion and in a predetermined selected manner.

According to another feature of the invention, the kinoform shifts the lens characteristic in an amount sufficient to compensate for the temperature change in the bulk portion.

According to another feature of the invention, the lens forms part of a lens arrangement which includes spacers for spacing it from a target such as an object or a film, and the kinoform compensation offsets not only the temperature induced shifts in the bulk portion but in the spacing as well.

According to yet another feature of the invention, the compensation counteracts the effect of temperature changes in back focal length at a dominant wavelength; and, according to yet another feature, it offsets the effects of temperature changes on spherical aberrations.

According to yet another property of the invention, the kinoform power is normally greater than the bulk refractive power.

The foregoing and other features of the invention are particularly set forth in the claims.

BRIEF DESCRIPTION OF THE DRAWINGS

The principles of the present invention may be clearly understood by considering the following detailed description in conjunction with the accompanying drawings in which.

DESCRIPTION OF PREFERRED EMBODIMENTS

Figure 1:
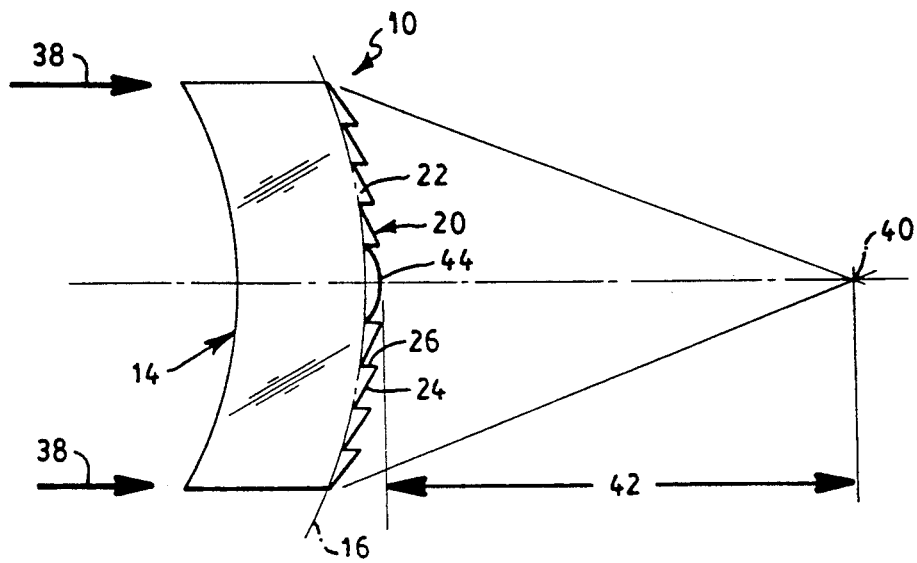
FIG. 1 is a diagrammatic cross-section of a thin lens embodying features of the invention.
Figure 2:
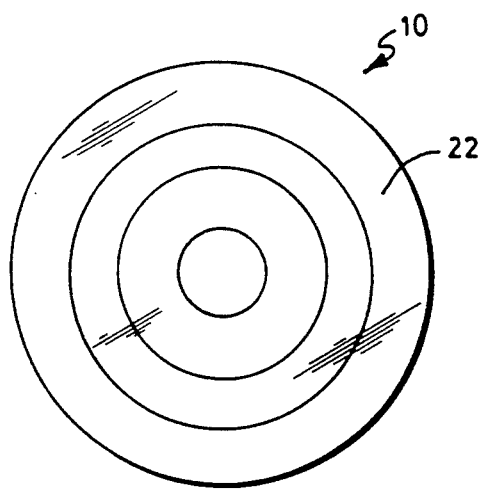
FIG. 2 is a diagrammatic rear view of the lens in FIG. 1.

FIGS. 1 and 2 illustrate a hybrid lens 10 composed of a single plastic material. According to one embodiment of the invention, the material is a plastic known as polymethylmethacrylate (PMMA). Lens 10 comprises a negative refractive surface 14 on one side and a generally convex composite surface which one may consider as composed of a base positive refractive surface 16 and a kinoform 20. Kinoform 20 includes annular grooves, 22 having typical outer profiles 24 and inner rises 26. The underlying base shown as surface 16 extends along the valleys of annular grooves 22.

Figure 3:
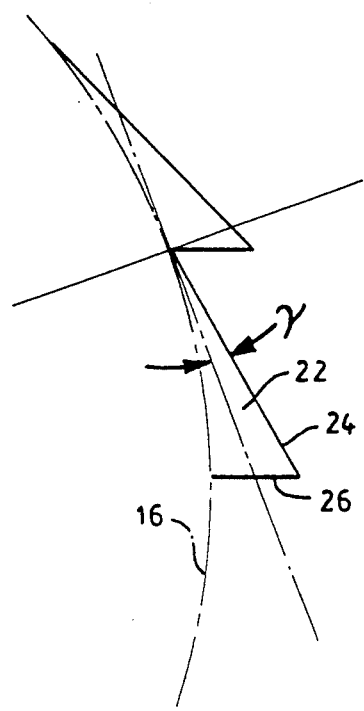
FIG. 3 is an enlarged diagrammatic view of part of some of the features of the lens of FIG. 1.

The profiles 24 form angles y measured from a line parallel to surface 16 at the apex of each groove 22 as shown in FIG. 3. The underlying refractive surface 16 and the refractive surface 14, together with the material between them define a bulk refractive lens or lens portion. Depending on the refractive index of the material, this lens portion exhibits a bulk power, $\phi_B$, quite apart from kinoform 20. The distances between adjacent valleys or peaks in the kinoform 20 determine the power of the kinoform. The profiles 24 are shaped to maximize the amount of light that goes into a selected diffraction order of kinoform 20. Obviously, it will be appreciated that the scale of the feature of lens 10, and others shown subsequently, have been greatly exaggerated for clarity in illustrating principles.

As is well-known, a kinoform is a diffractive wavefront reconstruction device as described, for example, by L. B. Lesem, P. M. Hirsch, and J. A. Jordan, Jr. in the IBM Journal of Research Development, pp 150-155, (1969). Kinoforms may be considered as phase matched Fresnel lenses with phase steps of $2K\pi$ where K is an integer designating the diffraction order, i.e., the height of rise 26. As such, they combine properties of a classic Fresnel lens, O. E. Miller, J. H. McLeod and W. T. Sherwood, "Thin Sheet Plastic Frensel Lenses of High Aperture", (JOSA Vol, No. 1, pp 807-815, Nov. 1951) with those of a classic Fresnel zone plate Robert W. Wood, Physical Optics, Third Edition (1934), Optical Society of American Reprint, pp 32-39; pp 252-254 (1988). As used herein, the term refers to phase-only surface-relief lenses that can be made to be nearly 100% efficient for a given wavelength and order by designing the geometry of each groove through choice of the shape and depth of each peak and valley, neglecting absorption.

Temperature induced changes in the optical characteristics, for example, in this case back focal length at a given wavelength, of the bulk portion lens 10 occur at a rate different from changes in the same characteristics, over the same temperature changes, in kinoform 20. Moreover, in PMMA lens 10, kinoform 20 exhibits temperature induced focal length changes of a sign opposite to that of the refractive bulk portion.

Together the bulk lens, with its refractive surface 14 and surface 16, and the kinoform 20 focus collimated rays of light 38 onto a focal point 40 at a back focal length 42 from the vertex of the kinoform 20, shown designated at 44. Thermally induced changes in the index of refraction and the geometry of the bulk lens bounded by the refractive surfaces 14 and 16 would ordinarily change back focal length 42 of lens 10 for any predetermined wavelength, such as 815 nm. In FIGS. 1 and 2, kinoform 20 offsets such temperature-induced changes in the index of refraction and the geometry of the bulk lens for a predetermined wavelength. This results in a substantially temperature-independent, i.e., athermalized, back focus for lens 10 at the predetermined wavelength. The athermalization may occur exactly at chosen temperatures and vary slightly between the temperatures. On a practical basis, one can consider it as covering a given temperature range.

The material of lens 10, including the bulk lens and kinoform 20 is a continuous material, i.e., PMMA. Available handbooks, such as the Photonics Handbook, published in 1991 (T. C. Laurin, Pittsfield, Mass.) pages H-302 and H-304, contain information about the material response to temperature. The same handbook permits determination of the power of kinoform 20, and one can select the kinoform power to be opposite in sign from the power of the underlying bulk lens. The total power of the lens 10, considered as a thin lens, is equal to the power $\phi_B$ of the bulk lens plus the power $\phi_K$ of kinoform 20. Thus:

$$\Phi_T = \Phi_B + \Phi_K \quad (1)$$

In the ideal athermalized lens 10 the total temperature induced change $d\Phi_T/dt$ equals 0. Hence, $$\frac{d\Phi_T}{dt} = \frac{d\Phi_B}{dt} + \frac{d\Phi_K}{dt} = 0 \quad (2)$$

On a practical basis, $d\Phi_B/dt$ is substantially equal to minus $d\phi_K/dt$ in the athermalized lens at the predetermined wavelength, such as 815 nm, over a given temperature range.

Making the hybrid lens 10 of FIGS. 1 and 2 so it substantially reduces the change in focal length or other optical properties with temperature involves, collectively, optimizing the shapes of surfaces 14 and 16 of the bulk lens, determining the temperature induced change in power of the bulk lens as a refractive element, and also defining the structure of kinoform so that its temperature induced change in power is equal in magnitude but opposite in sign to that of the refractive bulk lens. In this manner, these properties of hybrid lens 10 remain substantially constant at a given wavelength at its temperature varies over a selected range. In other words, as the power of the bulk lens increases or decreases with temperature, the power of kinoform 20 varies in the opposite direction to substantially counterbalance the effect of temperature induced changes of the bulk lens.

An expression for the change on index of refraction with temperature as it relates to the coefficient of linear expansion can be obtained as follows:

$$D = \frac{m}{L^3} = C\frac{n^2 - 1}{n^2 + 2} \qquad (3)$$

This relationship is known as the Lorentz-Lorenz relationship (Roy M. Waxler, Deane Horowitz, and Abbert Feldman, "Optical and Physical Parameters of Pleixglas 55 and Lexan", Applied Optics, Vol. 18, No. 1, p 101, Janurary (1989).
where
 D is the density of the PMMA material,
 m is the mass,
 L is length.
 C is a constant of proportionality.
 n is the refractive index.
The material expands or contracts to a length L from a length $L_o$ as follows:

$$L = L_o(1 + \alpha \Delta t) \qquad (4)$$

where $\alpha$ is the linear coefficient of expansion, and $\Delta t$ is the temperature change. Then:

$$\frac{dL}{dt} = L_o \alpha \qquad (5)$$

By using Equation (5) and differentiating Equation (3) we get:

$$\frac{dn}{dt} = \frac{-\alpha(n^2 - 1)(n^2 + 2)}{2n} \qquad (6)$$

For a value of $n = 1.49$, this gives a value $-1.73\,\alpha$ for dn/dt.

At the same time the approximate bulk power of a thin plano-convex or planar concave lens is:

$$\Phi_B = \frac{1}{f} = \frac{n-1}{r} \qquad (7)$$

As in Equation (4), $r = r_o(1 + \alpha \Delta t)$. Differentiating the value of $\phi_B$ we get $$\frac{d\Phi_B}{dt} = -\frac{n-1}{r^2}\frac{dr}{dt} + \frac{1}{r}\frac{dn}{dt} \qquad (8)$$

$$\frac{1}{\Phi_B}\frac{d\Phi_B}{dt} = -\frac{1}{r}\frac{dr}{dt} + \frac{1}{(n-1)}\frac{dn}{dt} \qquad (9)$$

Substituting for dn/dt results in the change in bulk power relative to an original bulk power $$\frac{1}{\Phi_B}\frac{d\Phi_B}{dt} = -\alpha\left[\frac{2n + (n + 1)(n^2 + 2)}{2n}\right] \qquad (10)$$

As a first order approximation, kinoform 20 varies in focal length $f = a^2/\lambda$, where a is the semidiameter of the first diffraction zone and $\lambda$ the wavelength in question. Hence $\phi_k = \lambda/a^2$. If we differentiate to obtain the temperature induced change and then divide by $\phi_k$ to show the change relative to a given power, we get $$\frac{1}{\Phi_K}\frac{d\Phi_K}{dt} = -2\alpha \qquad (11)$$

If the total power change $d\phi_T/dt$ is to be 0, $$\frac{d\Phi_T}{dt} = \frac{d\Phi_B}{dt} + \frac{d\Phi_K}{dt} = 0 \qquad (12)$$

$$\frac{d\Phi_T}{dt} = -\alpha\left[\frac{2n + (n - 1)(n^2 + 2)}{2n}\right]\Phi_B - 2\alpha\Phi_K = 0 \qquad (13)$$

So $\phi_T$ will be constant with temperature when:

$$\frac{\Phi_K}{\Phi_B} = -\left[\frac{2n + (n + 1)(n^2 + 2)}{4n}\right] \qquad (14)$$

With a refractive index of 1.49, the ratio of kinoform power to bulk power is $-2.263$, an approximate result derived from fundamental principles.

These equations permit first order approximation of $\phi_B$ and $\phi_K$ for a desired valued $\phi_T$.

A more accurate determination is available from handbook computation, using $$\frac{dn}{dt} = -11.5 \times 10^{-5} \text{ per degree C.} \qquad (15)$$

Figure 4:
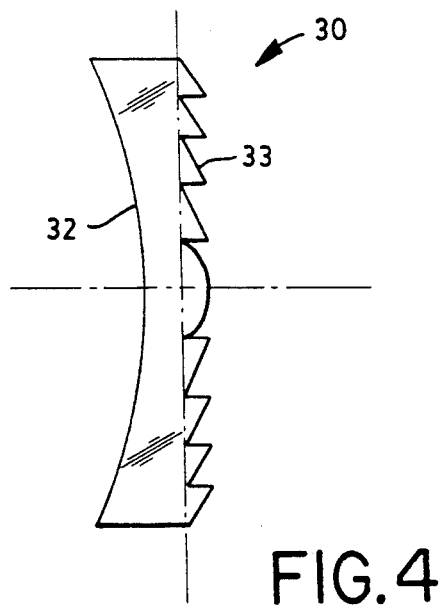
FIG. 4 is a diagrammatic, cross-section of a thin convex -plano lens of the invention.

The focal length of the bulk portion of a thin concave plano lens 30 as shown in FIG. 4 is $f_B = r/(n-1)$ where r is the effective radius of its front surface 32 and 33 is its kinoform. Starting from a value $r = r_0$ and an index $n = n_0 = 1.49$, the changed focal length in the bulk lens portion for each degree change in centigrade of the lens 30, assuming again PMMA lens is:

$$f_B = \frac{r}{(n-1)} = \frac{r_0(1 + \alpha\Delta t)}{n_0 + dn/dt\Delta t - 1} = \qquad (16)$$

$$\frac{r_0(1 + (6.74 \times 10^{-5}\Delta t))}{(n_0 - 11.5 \times 10^{-5}\Delta t) - 1} =$$

$$\frac{r_0}{(n_0 - 1)}\frac{1 + 6.74 \times 10^{-5}\Delta t}{1 - 23.47 \times 10^{-5}\Delta t} = \qquad (17)$$

$$\frac{r_0}{n_0 - 1}(1 + 30.21 \times 10^{-5}\Delta t)$$

The equation that expresses the relationship for the temperature related changed focal length per degree centigrade in kinoform 33 is:

$$f_K = \frac{a^2}{\lambda} = \frac{a_0^2(1 + \alpha\Delta t)^2}{\lambda} = \frac{a_0^2(1 + 6.74 \times 10^{-5}\Delta t)^2}{\lambda} = \qquad (18)$$

$$\frac{a_0^2}{\lambda}[1 + 13.48 \times 10^{-5}\Delta t]$$

The ratio of the bulk lens power change rate to that of the kinoform power change rate, after solving the above equations, is:

$$-\frac{30.21 \times 10^{-5}}{13.48 \times 10^{-5}} = -2.241 \qquad (19)$$

This result, based on published measured properties of PMMA, is in excellent agreement with equation (14), from fundamental electromagnetic properties of matter. There are other materials, however, such as glasses, for which dn/dt does not follow the Lorentz-Lorenz relation. For them, measured values must, of course, be used.

Another embodiment of the invention involves measuring the values of temperature induced changes and constructing the inventive lens on the basis of the measurements on the material and the lens. A combination of calculations and measurements also serves this purpose.

In thin lens 30, using PMMA as the lens material, with handbook values to determine the bulk power for both the bulk lens portion and for the kinoform portion, the ratio of percentage change in the bulk power to that of the kinoform is 2.24 as stated previously. All phase steps in the kinoform 33 are $2\pi$, since the design diffractive order is 1. Thus, the power of the bulk lens changes at a rate 2.24 times as fast as does the percentage power of the kinoform portion as the temperature of the material increases, and in a direction opposite to that of the kinoform portion. For example, if the bulk lens portion has a power of $-0.806$ diopter, and the kinoform portion has a power of $+1.806$ diopter, the sum of the two is $+1.00$ diopter. With a change of 1° C., the bulk lens portion will weaken by 2.24 times the rate at which the kinoform power weakens. Because of the substantially linear relationship between the rate of change of the bulk power and the kinoform power, the net power change across entire lens element 30 at different temperatures will be substantially zero, at least as a first approximation. Accordingly, the back focal length of lens element 30 tends to remain substantially constant despite the variation in temperature which it may experience.

According to another embodiment of the invention, the kinoform power reduces the response of the inventive lens to changes in temperature without totally athermalizing the lens. That is, the kinoform does not offset the temperature-induced variations entirely, but only to achieve a predetermined effect, i.e., $$d\frac{\phi_B}{dt} + d\frac{\phi_K}{dt} \neq 0$$

Figure 5:
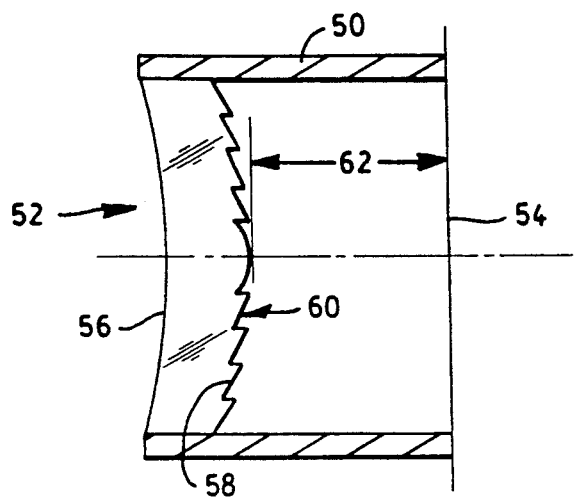
FIG. 5 is a diagrammatic, cross-sectional view of a device embodying features of the invention.

Consequently, the invention is applicable not only for athermalizing a lens alone, but an entire device, which includes the inventive lens and other elements such as a spacer which may be used for locating the lens with respect to a focal plane, film, or detector. An embodiment like this appears in FIG. 5. Here, a spacer 50 spaces a lens 52 from a plane 54, which may be a film or detector. The spacer 50 constitutes a lens mount or other structure that supports the lens relative to the plane 54. The lens 52 includes a refractive surface 56, a kinoform 60, and a bulk portion again formed by the refractive surface 56 and a base surface 58 in which kinoform 60 resides. The spacer 50 exhibits a temperature induced change in dimensions which varies the spacing 62 between lens 52 and plane 54. The structure of lens 52 is similar to that of lens 10. However, here the relationship between the bulk power $\phi_B$ and the kinoform power $\phi_K$ serves not only to correct temperature induced changes within the lens 52, but also, for temperature induced dimensional changes in the spacer 50.

The kinoform 60 and bulk lens portion of lens 52 have structures to maintain the focus of the lens 52 constant over a given temperature range at a predetermined wavelength despite thermally induced changes in lens 52 and in the spacer 50. Specifically, kinoform 60 does not compensate only for the temperature induced changes of the bulk portion. Rather, kinoform 60 departs from lens athermalization alone and compensates for both temperature-induced bulk power changes and temperature-induced changes in the linear dimension of spacer 50, enough to keep the focus of the lens of the plane 52. Where $S_S$ is the dimension of the spacer, the following conditions prevail:

$$\frac{d(FL)}{dt} = \frac{d}{dt}\left(\frac{1}{\phi_B + \phi_K}\right) = \frac{dS_S}{dt} \tag{21}$$

Figure 6:
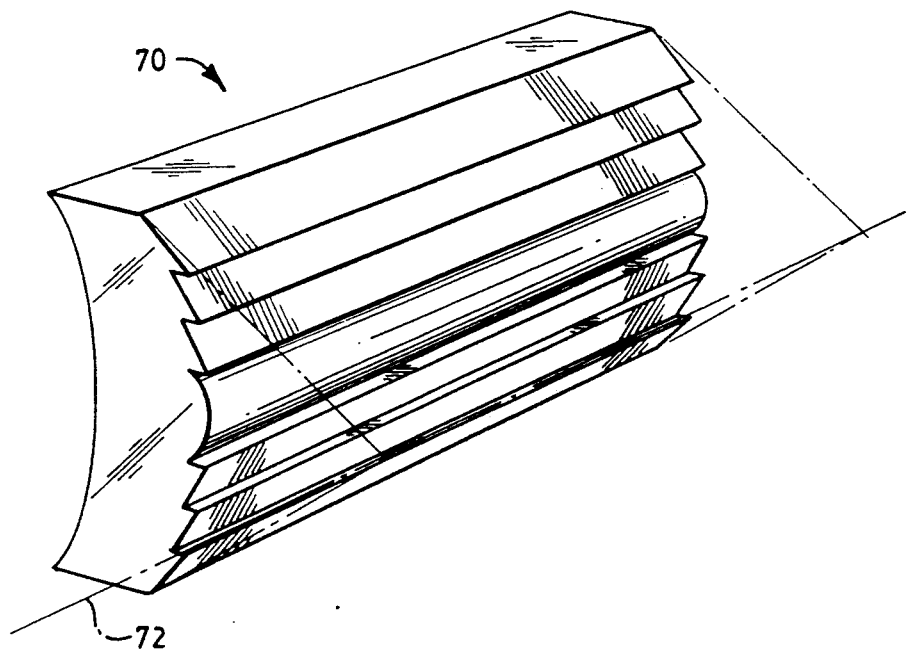
FIG. 6 is a diagrammatic perspective view of another lens embodying features of the invention.

An embodiment of the invention using a cylindrical lens appears in FIG. 6. Here, the material, values of $\phi_B$, $\phi_K$, and n are the same as the values for $\phi_B$, $\phi_K$, $n_O$ in FIGS. 1 and 2. FIG. 6 depicts a cylindrical lens element 70. The cylindrical lens 70 focuses on a line and corrects for temperature induced focal length changes in the same manner as the examples of FIGS. 1 and 2. Lens 70 of FIG. 6 has its kinoform grooves running parallel to axis 72. The focal length of these cylindrical lenses likewise can be made to remain substantially constant as temperature varies.

According to another embodiment of the invention, spacer 50 spaces the lens 70 from the focal plane 54. That is, the lens 70 replaces the lens 52 in FIG. 5. The same power conditions as in the lens of FIGS. 1 and 2 prevail.

Figure 7:
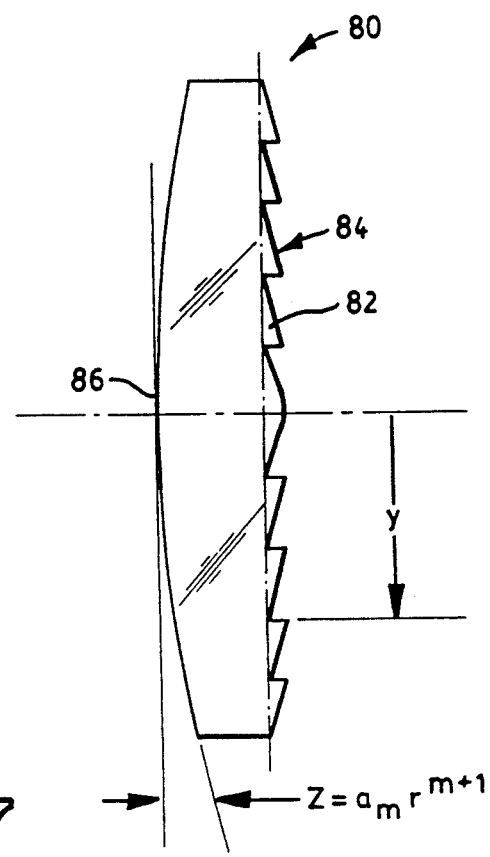
FIG. 7 is a diagrammatic, cross-sectional view of another lens embodying features of the invention.

Another more detailed embodiment of the invention appears in FIG. 7. Here a hybrid or composite lens 80 corrects not only for temperature induced back focal length changes but for image quality by controlling the aberrations in the image by using an aspheric front surface 86 for the refractive surface, and kinoform grooves 82. Hybrid lens 80 works well at a wavelength of 815 nm, is an F/2 lens, has a normal back focal length (BFL) of f=5 mm and exhibits diffraction limited performance over a field of view of 1° for a temperature range of 0° C. to 40° C., for the first order. At 0° C. the BFL is 5.0 mm, at 20° C. the BFL is 4.993, and at 40° C. it is 5.0 mm. Thus, this lens is athermal to less than 1 part in $10^{+4}$. Details of the lens 80 in FIG. 7 were obtained by first modeling lens 80 with an equivalent refractive lens having the following constructional data with the kinoform represented by a fictitious high index layer defined on one side by a sphere and on the other by an asphere.

| CURVATURE | THICKNESS | INDEX | MATERIAL |
| --- | --- | --- | --- |
| OBJ: | | | |
| 0.000000 | INFINITY | 1.495400 | |
| 1: | | | |
| −0.30724044 | 0.50000 | PLEXI | PLEXI |
| ASPHERIC: | | | |
| K: 0.00000 | KC: 100 | | |
| IC: YES | CUF: 0.0000 | CCF: 100 | |
| A: 0.956778E-02 | B: 0.750010E-03 | C: 0.00E + 0 | D: 0.00E + 00 |
| AC: 0 BC: 0 | CC: 100 | DC: 100 | |
| 2: | | | |
| 0.11126357 | 0.0 | 10001 | |
| STOP: | | | |
| 0.11122365 | 5.006346 | | |
| ASPHERIC: | | | |
| K: 0.0 KC: 100 | | | |
| IC: YES | CUF: 0.0 | CCF: 100 | |
| A: 0.417578E-06 | B: 0.0 | C: 0.0 | D: 0.0 |
| AC: 0 BC: 100 | CC: 100 | DC: 100 | |
| IMG: | | | |
| 0.00000 | 0.00000 | 100 | 100 | where:

-continued

Dimensions are in mm;
Wavelength is 815 mm;
OBJ stands for "Object";
and the aspheric sag profile is given by:

$$Z(y) = \frac{(CV)y^2}{1 + \sqrt{1 - (1 + K)(CV)^2 y^2}} + ay^4 + by^6 + cy^8 + dy^{10} \quad (22)$$

K stands for the conic constant;
a, b, c, d are aspheric coefficients
(CV) is the base curvature
INFINITE

| CONJUGATES | T = 0° C. | T = 20° C. | T = 40° C. |
|---|---|---|---|
| EFL | 4.7579 | 4.7578 | 4.7592 |
| BFL | 5.0000 | 4.9993 | 5.0000 |
| FFL | −4.2097 | −4.2094 | −4.2103 |
| FNO | 1.9031 | 1.9031 | 1.9037 |
| IMG DIS | 5.0000 | 4.9991 | 5.0000 |
| CAL | 0.4994 | 0.5000 | 0.5007 |
| PARAXIAL IMAGE | | | |
| HT | 0.0830 | 0.0830 | 0.0831 |
| ANG | 1.0000 | 1.0000 | 1.0000 |
| ENTRANCE PUPIL | | | |
| DIA | 2.5000 | 2.5000 | 2.5000 |
| THI | 0.3178 | 0.3186 | 0.3196 |
| EXIT PUPIL | | | |
| DIA | 2.6272 | 2.6269 | 2.6265 |
| THI | 0.0000 | 0.0000 | 0.0000 |
| STO DIA | 2.6766 | 2.6762 | 2.6756 |
| WAV | | | |

In lens 80 of FIG. 7, kinoform grooves 82 have respective radii or semi-diameters y which are extracted from the equivalent refractive model, i.e., a groove exists at each position where the optical path difference (OPD) introduced by the kinoform structure equals a multiple of the wavelength λ for the first order. That is, a groove 82 occurs when:

$$OPD(y) = Ki\lambda \quad (23)$$

where $i = +1, 2, 3, 4, 5 \ldots$ numbers of zones.

Here, the diffractive nature of a kinoform was simulated by the Sweatt model (W. C. Sweatt, J. Opt. Soc. Am., 67 804 (1977) and J. Opt. Soc. Am., 69, 486 (1979)). In this model, a kinoform is represented by a thin lens of central thickness zero and a very large index of refraction. An index of 10,001 was appropriate for this example. The surfaces of the equivalent lens can be aspheres of the form $Z = a_m r^{m+1}$ as needed (See FIG. 7) to correct for aberrations.

The OPD (optical path difference) introduced by the kinoform 84, i.e., the collection of grooves 82, is in general:

$$OPD = (n_{high} - 1)(Z_2 - Z_1) \cos(\tan^{-1}\epsilon) \quad (24)$$

where ε is the interior angle made by the ray in question with respect to the optical axis in the high index equivalent lens.

The following equation provides the value Z.

$$Z_{asphere} = \frac{(CV)}{2} y^2 + Gy^4 + Hy^6 + Iy^8 + Jy^{10} \quad (25)$$

Where CV = the vertex curvature of an asphere, and where:

$$G = a + \left[\frac{(1 + K)}{8}\right](CV)^3 \quad (26)$$

$$H = b + \left[\frac{(1 + K)^2}{16}\right](CV)^5 \quad (27)$$

$$I = c + \left[\frac{5(1 + K)^3}{128}\right](CV)^7 \quad (28)$$

$$J = d + \left[\frac{7(1 + K)^4}{256}\right](CV)^9 \quad (29)$$

Where K = conic constant; and a, b, c, d are aspheric departures. Continuing:

$$\cos(\tan^{-1}\epsilon) = 1 - \left[\frac{(CV)^2}{2}\right]y^2 + \quad (30)$$

$$\left[\frac{(CV)^4}{24} - 4(CV)G + \frac{(CV)^4}{3}\right]y^4 +$$

$$\left[6(CV)^3 G - 6(CV)H - \frac{5(CV)^6}{16} - 8G^2\right]y^6 + \quad (31)$$

$$y^8 \left[9(CV)^3 H + 36(CV)^2 G^2 - \frac{15(CV)^5 G}{2} - 24GH - \right. \quad (32)$$

$$\left. 8(CV)I + \frac{35(CV)^8}{128}\right]$$

By appropriately substituting equation 23 to 30 into equation 22 we obtain values of y when the OPD = iλ.

The following table shows the values of y for the first five and last five zones or grooves 82 where the wavelength λ is 815 nm:

| Zone # | y (mm) | Zone size (mm) | Zone size (wavelengths) |
|---|---|---|---|
| 1 | 0.063902 | 0.026472 | 32.481 |
| 2 | 0.090374 | 0.020316 | 24.927 |
| 3 | 0.110690 | 0.017128 | 21.016 |
| 4 | 0.127818 | 0.015092 | 18.318 |
| 5 | 0.142910 | | |
| 476 | 1.242816 | 0.001735 | 2.129 |
| 477 | 1.244551 | 0.001735 | 2.127 |
| 478 | 1.246284 | 0.001731 | 2.124 |
| 479 | 1.248015 | 0.001729 | 2.121 |
| 480 | 1.249744 | | |

Hybrid lens 80 corrects not only for back focal length as temperature varies, but also for other aberrations.

Figure 8:
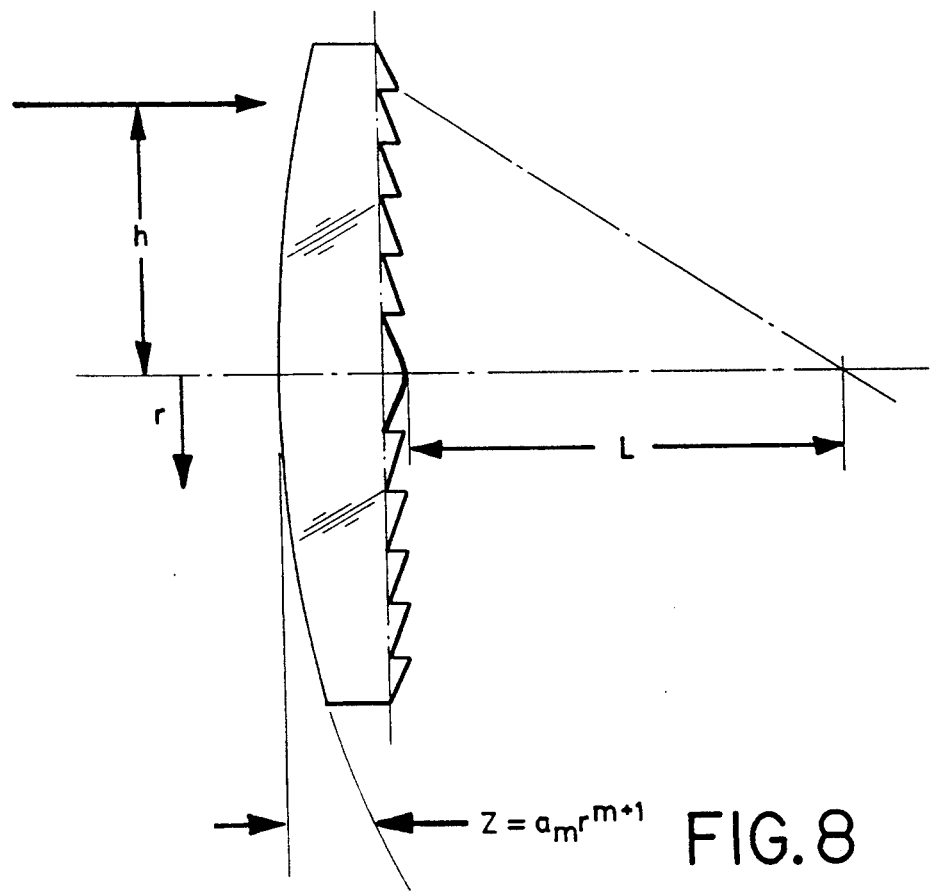
FIG. 8 is a diagrammatic view of a special lens as an example for athermalizing any selected order of spherical aberration.

In the earliest discussion, a thin lens solution was derived to show that a conventional (bulk) lens can be constructed with a kinoform surface, even made of the same material, to achieve stability of an image position with temperature. The immediately preceding example was more complicated, showing an aspheric refractive surface. The more general care of a thin lens is seen in FIG. 8. We now can show that this art will also permit athermalization of spherical aberration contributions of all orders, so that an image will remain fully sharp and well-defined, as well as stationary as temperature changes. The lens of FIG. 8 is thin and nearly flat. As a bulk lens it derives its power from the left side, which can be defined in shape by a polynomial expression made up of power terms such as $Z=a_m r^{m+1}$, where, Z is the departure of the lens surface from flatness at distance r from its axis, $a_m$ is a constant to be selected, and m is a chosen integer. A weak elementary simple lens is well represented by the parabolic term with $m=1$. We can select terms with other values of m, either singly or in combination, to represent arbitrary amounts of spherical aberration, enabling us to make the focal length L of the lens remain exactly constant at any choice of zonal height h, or to cause L to vary as a function of h at any rate desired. For present purpose here we can describe the left surface of the lens with any *one* of the power terms and will show that it can be athermalized individually by a suitable choice of kinoform on the right side. Any desired general lens can then be described by a summation or superposition of such pairs of bulk power terms and kinoform athermalizing solutions, and such a general lens will be athermalized to any or all orders of spherical aberration.

The kinoform side may be described mathematically in various ways, including a tabulation of the radius of each and every grooved facet. Here we will again use the Sweatt model, in which a kinoform is replaced with a vanishingly thin lens formed of a fictitious material of absurdly high refractive index, in such a way that the mathematically important optical properties of that material approach sufficiently close to the properties of a kinoform. One can think of any tiny sample of the area of a kinoform as identical in functions to a tiny diffraction grating; in the Sweatt model each such elemental diffraction grating is replaced by a tiny wedge prism of increasing refractive index and vanishing angle, matching that diffraction grating in all light-deviation properties. By analogy with the bulk (left) side of our lens, we will describe the kinoform (right) side of our lens by use of the Sweatt model equivalent with shape defined by terms such as $Z=b_m hr^{m+1}$. (It is familiar art to convert such a description together with the fictitious high refractive index, to a tabular listing of all of the grooved facet zonal radii needed for constructing any resulting embodiment.)

Figure 9:
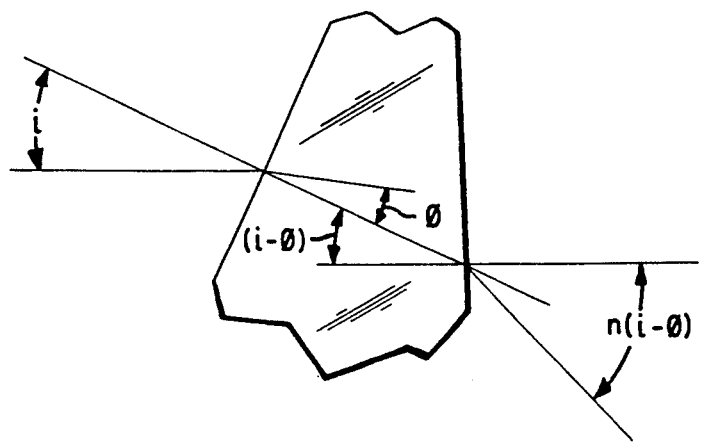
FIG. 9 is a diagrammatic view used to illustrate certain mathematical relationships helpful in understanding the invention.

At a general ray height, h, a ray of light parallel to the lens axis will encounter a surface $Z=a_m r^{m+1}$ at a depth $Z=a_m h^{m+1}$ beyond a flat surface and strike it at an angle of incidence i given by its slope $i=Z'=(m+1)a_m h^m$ (See FIG. 9). (Because the lens is weak, we will make no distinction here between the small angles, their tangents, and their sines.) By Snell's law the refracted angle is $\theta=i/n$, within the bulk material of index n. The angle this ray now makes with the axis is $i-\theta=(m+1)(1-1/n)a_m h^m$. At the flat right side the ray will encounter the surface at this same angle $(i-\theta)$ of incidence, and by Snell's law again will emerge at the angle:

$$n(i-\theta)=(m+1)(n-1)a_m h^m. \tag{33}$$

Because the lens is very thin, we ignore the small change in height where the ray emerges. Our ray will cross the lens axis at the distance L given by $L=h/n(i-\theta)$, and we may consider this a kind of "focal length" associated with this zonal height, h, and this choice of $a_m$ and m. For convenience in combining the influence of the bulk lens with that of the kinoform, we will express this as a "power", $P_B$, $$P_B=1/L=n(i-\theta)/h=(m+1)(n-1)a_m h^{m-1}.$$

To evaluate $P_B$ after thermal expansion, we note that $$Z=a_m[h(1-\alpha\Delta t)^{m+1}/(1-\alpha\Delta T)] \tag{35}$$

and $$Z'=(m+1)a_m[h(1-\alpha\Delta t)]^m \tag{36}$$

We note also that $P_B=(n-1)Z'/h$. Therefore, $$\frac{dP_B}{dt} = \frac{(n-1)}{h} \frac{dZ'}{dt} + Z'\frac{dn}{dt} Ih \tag{37}$$

$$= \frac{(n-1)}{h} m(m+1)a_m[h(1-\alpha\Delta t)]^{m-1}(-h\alpha) - \tag{38}$$

$$\frac{\alpha(n^2-1)(n^2+2)}{2n} z'Ih$$

(The second term was derived earlier from the Lorentz-Lorenz relation.) And finally this can be simplified to:

$$\frac{dP_B}{dt} = -P_B\alpha \left[ m + \frac{(n+1)(n^2+2)}{2n} \right] \tag{39}$$

On the kinoform side, using the Sweatt representation of the kinoform and high fictitious index N, we have a similar set of calculations. At ray height h, ignoring slight height and slope changes introduced by the thin bulk lens, $$Z=b_m h^{m+1} \tag{40}$$

$$Z'=(m+1)b_m h^m \tag{41}$$

By the same reasoning as before for the other surface, $$P_K = \frac{(N-1)Z'}{h} = (N-1)(m+1)b_m[h(1-\alpha\Delta t)]^m - \tag{42}$$

Again, $$\frac{dP_K}{dt} = \frac{(N-1)}{h} \frac{dZ'}{dt} + \frac{Z'}{h} \frac{dN}{dt} \tag{43}$$

$$= \frac{(N-1)}{h} m(m+1)b_m[h(1-\alpha\Delta t)]^{m-1}(-h\alpha) \tag{44}$$

$$- \frac{(m+1)}{h} b_m h^m \alpha(N-1) \tag{45}$$

The second term here is derived not from the Lorentz-Lorenz relation, but from the temperature dependence of the fictitious material of index $N=N_o(1-\alpha\Delta t)$ implicity needed to match the Sweatt model to the thermal expansion rate of $\alpha$ of each elemental diffraction grating expanding at the rate $(1+\alpha\Delta t)$.

Finally we can simplify the expression to:

$$\frac{dP_K}{dT} = -(m+1)\alpha P_K \tag{46}$$

So for the mth order of both surfaces, when combined, we have the sum:

$$P=P_B+P_K$$

To athermalize this $m^{th}$ order we require:

$$O = \frac{dP}{dt} = \frac{dP_B}{dt} + \frac{dP_K}{dt} = \quad (47)$$

$$-\alpha\left(\left[m + \frac{(n+1)(n^2+2)}{2n}\right]P_B + (m+1)P_K\right)$$

Let m=1, n=1.49 for example:

$$\frac{dP}{dt} = -\alpha\{4.526P_B + 2P_K\} = O, \quad (48)$$

so $P_K = -2.263P_B$.

Let m=3, n=1.49 for example:

$$\frac{dP}{dt} = -\alpha\{6.526P_B + 4P_K\} = O, \quad (49)$$

so $P_K = -1.632P_B$.

Let m=5, n=1.49 for example:

$$\frac{dP}{dt} = -\alpha\{8.526P_B + 6P_K\} = O, \quad (50)$$

so $P_K = -1.421P_B$.

Let m=7, n=1.49 for example:

$$\frac{dP}{dt} = -\alpha\{10.526P_B + 8P_K\} = O, \quad (51)$$

so $P_K = -1.316P_B$.

The first example, for m=1, will be recognized as equivalent to the simple focus athermalization calculated earlier, and indeed for this case, the power P is not dependent upon h, and represents negligible spherical aberration. The successive terms show increasing dependence of P upon h, and represent successive orders of spherical aberration. In each order m, a combination of $P = P_B + P_K$ can always be found to add to a desired zonal power h, with a ratio of $P_K$ and $P_B$ such that P for that order m is athermalized to the degree desired. Note that the ratio $P_K/P_B$ will approach −1 for large m, so that athermalization may require increasingly large opposing contributions of $P_K$ and $P_B$.

The foregoing derivation shows explicitly that a solution will exist for the athermalization not merely of focal power, but also for each and every individual order of spherical aberration. An optical designer will recognize that the derivation will still apply, with numerical modifications, for other object and image distances and for lenses that are not thin and not weak and not flat.

Figure 10:
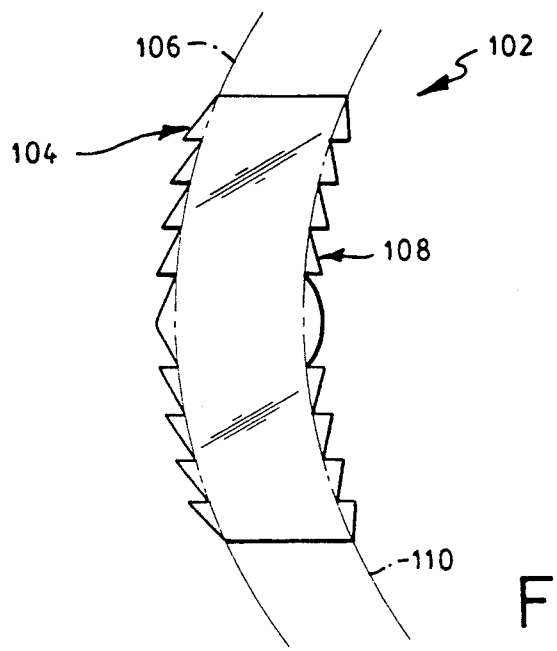
FIGS. 10 to 14 are cross sectional views of other lenses embodying features of the invention.

Another embodiment of the invention reduces or corrects the dependence of coma on temperature. This is done by splitting both the bulk power and the kinoform power of the lens between the front and back surfaces of the composite lens as shown in FIG. 10. In FIG. 10, a lens 102 has a kinoform 104 on front base surface 106, and another kinoform 108 on the rear base surface 110. It is well known in the art that a single lens element under a specified condition of use can be corrected for coma by "bending", or varying the relative optical power between its surfaces. The composite lens of FIG. 10 is effectively "bent" by transferring either bulk geometric power or kinoform power from one surface to the other to reduce coma, and following the above teaching an appropriate balance of kinoform power between the two surfaces can be used to make coma correction independent of temperature.

Figure 11:
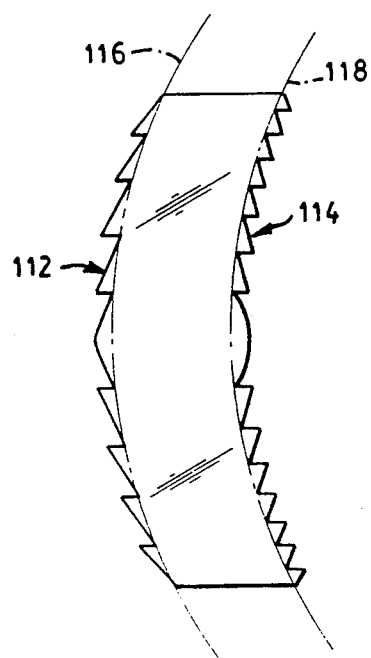

FIG. 11 illustrates another embodiment of the invention. Here the dependence of both coma and spherical aberration on temperature are substantially reduced by splitting the kinoform power between kinoforms 112 and 114 on the front and rear base surfaces 116 and 118 respectively, and by spreading the spacing between the grooved facets in each kinoform 112 and 114 to correct for spherical aberration.

Figure 12:
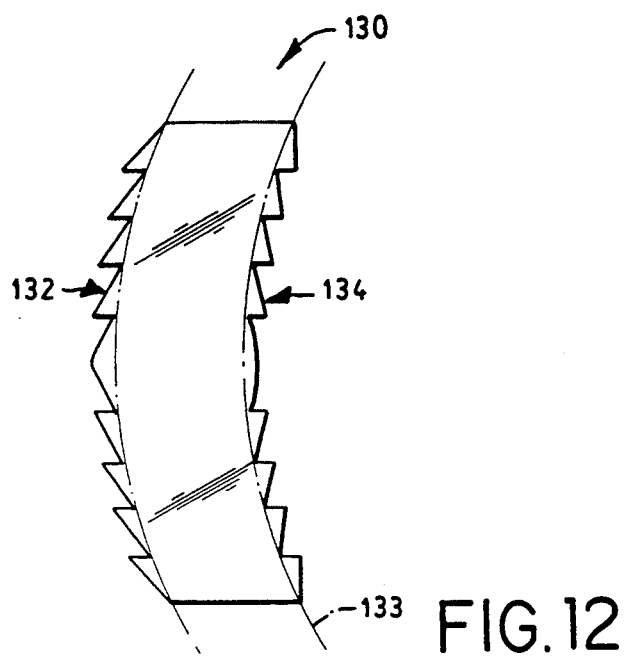

Another embodiment for the invention using PMMA can reduce the dependence of coma, spherical aberration, and back focal length on temperature. A composite lens 130 as shown in FIG. 12 has kinoforms 132 and 134 formed on both sides of the bulk refractive portion of the structure. Coma and spherical aberration are corrected as before the second example, except that a third power relationship is introduced for the second kinoform. Here, the equation expressing the relationship for back focal length is then:

$$P_{K1} + P_{K2} + P_B = k \quad (52)$$

where k is some constant so that:

$$\frac{(P_{K1} + P_{K2})}{P_B} = -M \quad (53)$$

The lenses of the invention fully incorporate passive means for reducing the temperature dependency of optical characteristics that vary with the geometry and refractive index of the lens. The lenses are nevertheless made of a single material.

FIG. 12 can also illustrate an example of an athermalized Germanium hybrid lens. Here lens 150 has the convex refractive surface 132. Kinoform 134 overlies a concave base surface 133. This lens is athermal to one part in $10^8$ at 10.6 microns.

Figure 13:
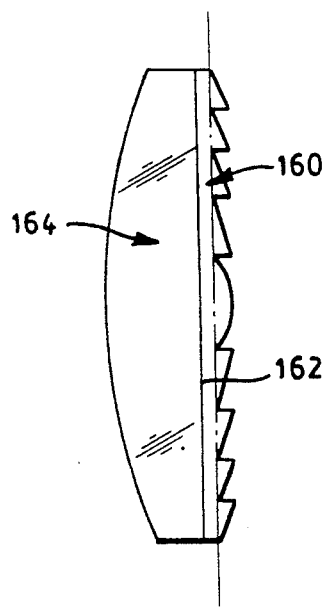
Figure 14:
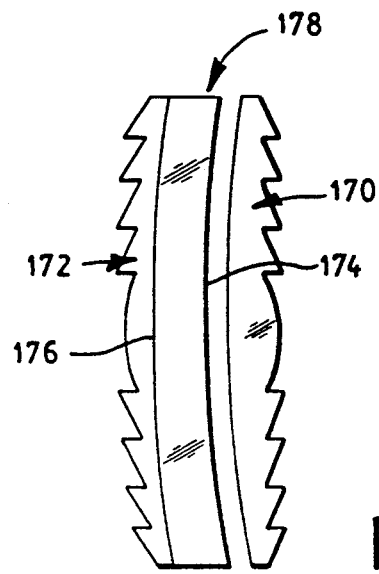

According to the embodiment of the invention shown in FIG. 13, a kinoform 160 is cemented onto one mechanically underlying surface 162 of a lens bulk 164. In FIG. 14 kinoform 170 is air-spaced from an underlying surface 174 and 172 is cemented to underlying surface 176 of a lens 178. According to the various embodiments of the invention, each of the examples lenses in the Figures have bulk refractive portions and kinoforms.

According to some embodiments of the invention, the lenses or systems do not fully athermalize the temperature dependence of the focal length or other characteristics but reduce them as required for particular applications. That is, the degree of athermalization is not complete, but the kinoform or kinoforms have powers which still compensate for the temperature induced changes in focal length or other characteristics of the lenses or devices.

According to different embodiments of the invention, various materials are used for the temperature-dependence reducing or athermalizing lenses. In each case, the kinoform accomplishes its athermalizing or temperature-dependence reduction end by exhibiting a power which is a substantial proportion of the bulk power. For example, the kinoform-bulk ratio for athermalized lenses may vary from 0.15 to 10.0. Preferably the ratio is between 0.5 and 2.0. In plastic lenses, the kinoform power has a sign opposite to the bulk power in the athermal case.

The following table shows examples of various achromatic hybrid lenses using different materials, and athermalized lenses using the same materials.

| Combination | Total Power | ACHROMAT Bulk | ACHROMAT Kino | ATHERMAT Bulk | ATHERMAT Kino |
|---|---|---|---|---|---|
| BK7/KINO | 1 | 0.9489 | 0.0511 | 1.3684 | −0.3684 |
| PMMA/KINO | 1 | 0.9433 | 0.0567 | −0.8769 | 1.8769 |
| GERM/KINO | 1 | 0.9974 | 0.0026 | 0.0843 | 0.9157 |
| KRS5/KINO | 1 | 0.9851 | 0.149 | −1.0240 | 2.0240 |

KRS5 is a Thalium-Bromide Thalium-Iodide material.
GERM is Germanium
BK7 is spectacle glass The above shows that in absolute terms, for any material, the kinoform in the athermalized hybrid lens contributes at least 4 times as much as the kinoform in the achromatized lens. In general, in the athermalized lens, the kinoform power contribution is at least 20% in absolute values, and in the achromatized lens the kinoform power contribution is less than 15%. In a plastic athermalized lens the kinoform power is either larger than the bulk power or of opposite sign.

The invention furnishes passively athermalized lenses and optical devices. It also provides lenses and devices whose variations in response to temperature changes are reduced passively to any desired degree.

While embodiments of the invention have been described in detail, it will be evident to those skilled in the art that the invention may be embodied otherwise.

The various embodiments illustrated may be fabricated using the techniques shown and described in an article by P. P. Clark and C. Londono, "Production of kinoforms by single point diamond machining", Optics News, December (1989) which is incorporated here in by reference.

Figure 15:
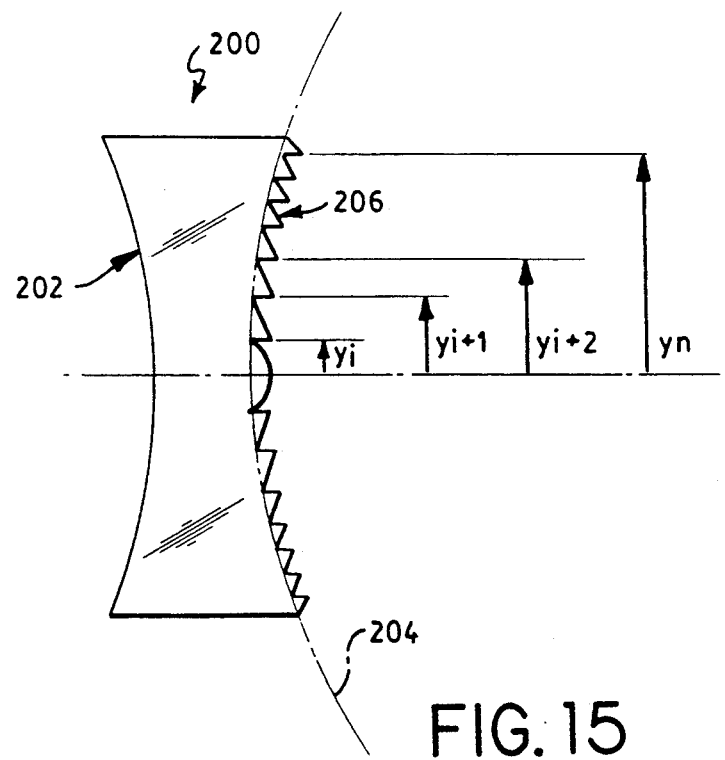
FIG. 15 is a diagrammatic view of an inventive lens fabricated of PMMA using diamond turning techniques.

One example of an inventive lens fabricated using diamond turning techniques is shown in FIG. 15 where it is shown at 200. Lens 200, fabricated of PMMA, comprises a front negative aspheric surface 202 and a rear aspheric base surface 204 on which is formed kinoform 206, itself a collection of grooves of varying size which are designated generally by 208. As before, surfaces 202 and 204 and the intervening material provide the refractive power for lens 200.

Figure 16:
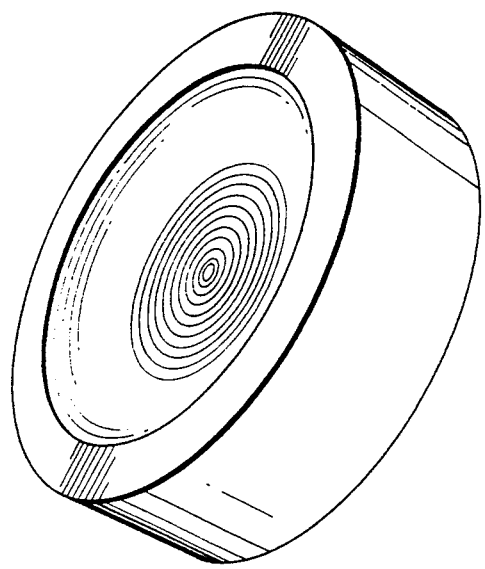
FIG. 16 is a perspective photograph of the lens of FIG. 15.

Lens 200 has an effective focal length of 50 mm at 0° C., an entrance pupil diameter of 12.5 mm and a relative aperture of f/4. FIG. 16 is a perspective photograph of it from the vantage point of looking up from the lower right quadrant (referenced to viewing the front surface face on) through the front surface with kinoform 206 appearing as imaged through front surface 202. Kinoform 206 has 1072 grooves which vary in radical width with the widest being close to the optical axis and the narrowest located at or near the largest clear diameter.

The base curvature of front surface 202 is 0.029043498801, and it has aspheric coefficients of: A=0.19491434E-05 and B=0.27304523E-08. Base surface 204 is spherical and has a curvature of 0.004306653067.

The radial position of grooves 208 along with radial width, given by in general by: $y_{n+1} - y_n$ appears in the following table where the last column also gives the width in waves based on a wavelength of 632 nm.

| ZONE | Y (mm) | SIZE (mm) | SIZE (waves) |
|---|---|---|---|
| 1 | 0.190.752 | 0.190752 | 301.44 |
| 2 | 0.269764 | 0.079012 | 124.86 |
| 3 | 0.330393 | 0.060628 | 95.81 |
| 4 | 0.381505 | 0.051112 | 80.77 |
| 5 | 0.426536 | 0.045031 | 71.16 |
| 6 | 0.467247 | 0.040711 | 64.34 |
| 7 | 0.504685 | 0.037438 | 59.16 |
| 8 | 0.539532 | 0.034847 | 55.07 |
| 9 | 0.572260 | 0.032729 | 51.72 |
| 10 | 0.603216 | 0.030956 | 48.92 |
| — | — | — | — |
| — | — | — | — |
| 1062 | 6.223288 | — | — |
| 1063 | 6.226224 | 0.002936 | 4.64 |
| 1064 | 6.229158 | 0.002935 | 4.64 |
| 1065 | 6.232091 | 0.002933 | 4.64 |
| 1066 | 6.235023 | 0.002932 | 4.63 |
| 1067 | 6.237954 | 0.002930 | 4.63 |
| 1068 | 6.240883 | 0.002929 | 4.63 |
| 1069 | 6.243811 | 0.002928 | 4.63 |
| 1070 | 6.246737 | 0.002926 | 4.62 |
| 1071 | 6.249662 | 0.002925 | 4.62 |
| 1072 | 6.252586 | 0.002924 | 4.62 |

The following table gives the variation in back focal length and power for lens 200 and includes for comparison the performance of a reference lens of the equivalent purely refractive power.

| | T = 0° | T = 20° | T = 40° |
|---|---|---|---|
| REFERENCE | | | |
| EFL | 49.695 | 50.000 | 50.308 |
| BFL | 46.756 | 47.052 | 47.351 |
| t | 4.993 | 5.000 | 5.007 |
| RMS WFE | .002/.0036 | .002/.037 | .002/.037 |
| max defocus, waves | 3.590 | −0.111 | −3.810 |
| HYBRID | | | |
| EFL | 49.993 | 50.000 | 50.007 |
| BFL | 52.374 | 52.372 | 52.374 |
| t | 4.993 | 5.000 | 5.007 |
| RMS WFE | .001/.036 | .002/.034 | .002/.034 |
| max defocus, waves | −0.040 | −0.045 | −0.049 |

Figure 17:
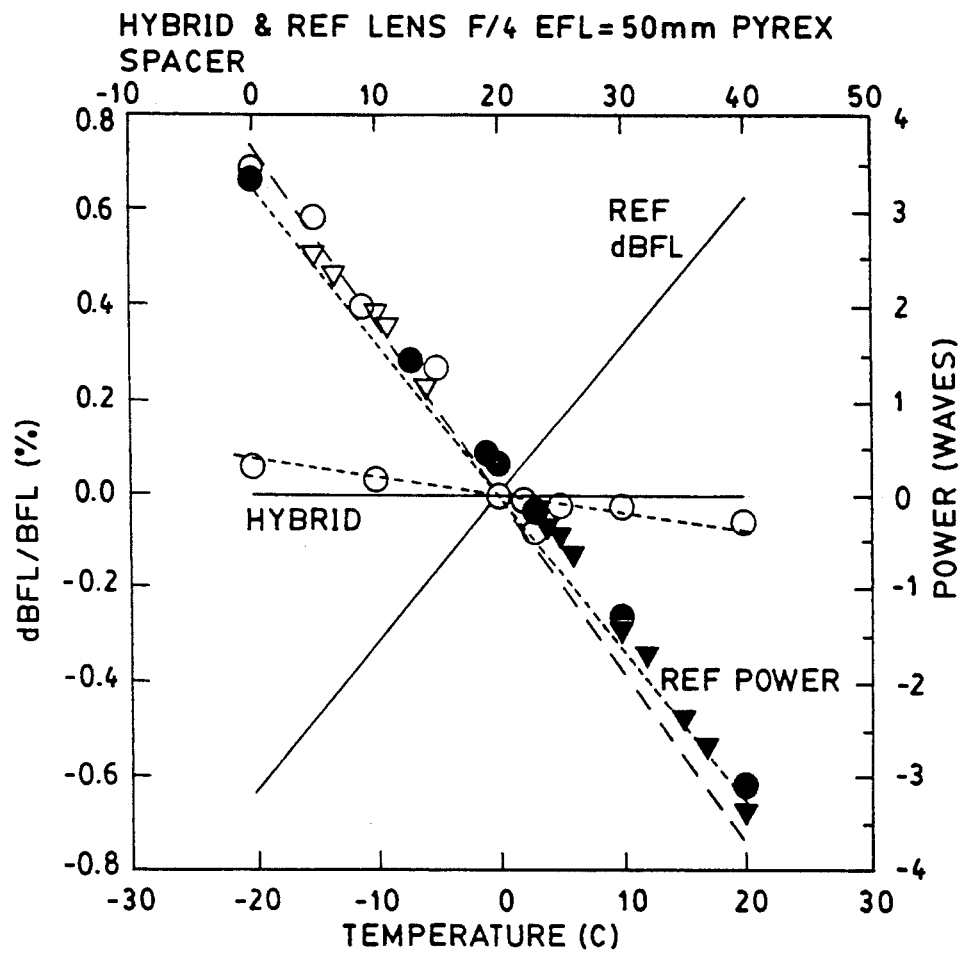
FIG. 17 is a graph showing the performance of the lens of FIG. 15 with temperature.

Finally, FIG. 17 shows is the graphical equivalent of the data of the foregoing table showing that the focal length of the inventive lens remains substantially constant over the displayed temperature range. The departure in the variation of focal length from a completely flat curve is believed to be because of slight differences between actual and assumed values for the actual material variation of index with temperature.

What is claimed is:

1. A lens comprising at least one refractive surface to provide said lens with purely refractive power and a kinoform comprising grooves formed on at least one surface to provide said lens with purely kinoform power, the sum of said refractive power and said kinoform power being equal to the total optical power of said lens, said refractive surface and said kinoform of said lens being structured and arranged with respect to one another so that, with changes in temperature, said refractive power and kinoform power change so that at least the total power and focal length of said lens remain constant at a given wavelength.

2. The lens as in claim 1, wherein the ratio of said kinoform power to said refractive power is negative and substantially constant over the temperature change.

3. The lens as in claim 1 wherein said refractive surface is substantially spherical.

4. The lens as in claim 1 wherein said refractive surface is substantially cylindrical.

5. The lens as in claim 1 wherein one of the surfaces has an aspheric component.

6. The lens as in claim 1 wherein said refractive surface has an aspheric component.

7. The lens as in claim 1 wherein said grooves of said kinoform have an aspheric profile.

8. The lens as in claim 1 wherein said grooves of said kinoform have aspheric profiles which change with temperature to compensate for changes in spherical aberration of said lens with temperature.

9. The lens as in claim 1 wherein said refractive surface is aspheric and changes with temperature to compensate for the thermally changing spherical aberrations of said lens.

10. A lens comprising:
a first refractive surface and a second refractive surface separated by a given axial thickness and defining a temperature dependent geometry, said lens having a refractive power;
a kinoform formed on said second refractive surface, said kinoform having a kinoform power, said kinoform power and said refractive power being equal to the total power of said lens;
said kinoform and said first and second refractive surfaces causing said lens to have spherical aberrations which change with temperature changes;
said first refractive surface being aspheric, said first refractive surface and said kinoform changing with temperature so that they correct for changes in said spherical aberrations with temperature.

11. A lens comprising a transparent material having a refractive index and having formed therein a first refracting surface and a second refracting surface defining a temperature dependent geometry to provide said lens with a refractive power;
said lens also having a first kinoform formed on said first refracting surface and a second kinoform formed on said second refracting surface, said kinoforms each having a kinoform power, the power of said kinoforms and said refractive power being equal to the total power of said lens;
said lens having coma which changes in response to changes in temperature, said kinoforms introducing changes in coma different in magnitude from the changes of said lens in response to the changes in temperature, and in a magnitude sufficient to reduce coma in the lens to substantially zero at a given wavelength.

12. An optical device comprising:
a lens composed of a single material having a refractive index and refractive power;
said lens having a first surface and a second refracting surface and forming a bulk between said first surface and said second refracting surface;
said bulk exhibiting variations in dimensions and refractive index in response to changes in temperature and changing a given characteristic of said lens;
said first surface forming a kinoform;
said kinoform having a power sufficient to vary the given characteristic of said lens in response to changes in temperature in a direction opposite to the direction which the changes in temperature impose on said bulk at a given wavelength.

13. The device of claim 12 wherein the kinoform power is sufficient to athermalize the optical device.

14. The device of claim 12 wherein said given characteristic is back focal length.

15. The device of claim 12 wherein said kinoform varies the given characteristic sufficiently to compensate for the variation which temperature changes impose on the bulk.

16. The device of claim 12 wherein the given characteristic is spherical aberration.

17. The device of claim 12 wherein the lens is a substantially spherical lens.

18. The device of claim 12 wherein the lens is a cylindrical lens.

19. The device of claim 12 wherein the characteristic is spherical aberration, and said kinoform has aspheric profiles, and the kinoform has a sufficient aspheric component to offset the changes in spherical aberration of said lens in response to changes in the temperature.

20. The device of claim 12 wherein the characteristic is spherical aberration,
said first surface having aspheric components and said kinoform having aspheric profiles, said kinoform having a sufficient aspheric component to offset the changes in spherical aberration of said lens in response to changes in the temperature at a given wavelength.

21. The device of claim 12 wherein the characteristic is coma;
said lens having a second kinoform of the material on said second refracting surface, said kinoforms each having a kinoform power which changes in response to changes in temperature and defines with the refractive power the total power of said lens;
said kinoforms introducing changes in coma different in magnitude from the changes of said refractive power in response to the changes in temperature, and in a magnitude sufficient to reduce coma in said lens to substantially zero at a given wavelength.

22. The device of claim 12 further comprising:
a spacer for spacing said lens from an optical target and exhibiting changes in dimensions in response to changes in temperature; and
said kinoform having a power sufficient to compensate at least partially for both the variations in said refractive power and in the spacer in response to changes in temperature.

23. The device of claim 22 wherein said kinoform has a power sufficient to compensate fully for both the variations in refractive power and in the spacer in response to the changes in temperature.

24. The device of claim 22 wherein said given characteristic is back focal length.

25. The device of claim 22 wherein said kinoform varies the given characteristic sufficiently to compensate for the variation which temperature changes impose on said lens.

26. The device of claim 22 wherein the given characteristic is spherical aberration.

27. The device of claim 22 wherein said lens is a substantially spherical lens.

28. The device of claim 22 wherein said lens is a cylindrical lens.

29. The device of claim 22 wherein the characteristic is spherical aberration, and the grooves of said kinoform has aspheric profiles, and the kinoform has a sufficient aspheric component to offset the changes in spherical aberration of said lens in response to changes in the temperature.

30. The device of claim 22 wherein the characteristic is spherical aberration, said first surface having aspheric components and said kinoform having aspheric profiles, and the kinoform having a sufficient aspheric component to offset the changes in spherical aberration of said lens in response to changes in the temperature at a given wavelength.

31. The device of claim 22 wherein the characteristic is coma;

said lens having a second kinoform formed on said second refracting surface, said kinoforms each having a kinoform power which changes in response to changes in temperature and defines with said refractive power the total power of said lens;

said kinoforms introducing changes in coma different in magnitude from the changes of said lens in response to the changes in temperature, and in a magnitude sufficient to reduce coma in said lens to substantially zero at a given wavelength.

32. A method of manufacturing an optical device comprising the steps of:

forming from a transparent material into a lens having a pair of refracting surfaces so that said lens has a given characteristic which varies in response to changes in temperature;

forming a kinoform on one of said surfaces with a power sufficient to vary the given characteristic of said lens in response to changes in temperature in a direction opposite to the direction which the changes in temperature impose on said lens at a given wavelength.

33. The method as in claim 32 wherein the step of forming the kinoform includes forming the kinoform with enough power to compensate for changes in temperature in an amount sufficient to athermalize the optical device.

34. The method as in claim 32 further comprising the step of mounting said lens on a mount, and wherein the step of forming the kinoform includes forming the kinoform with enough power also to compensate for at least a portion of temperature induced changes in the mount.

35. An optical system having an overall power $\phi_T$, said system comprising:

at least one lens having at least one refractive surface to provide said system with a refractive power, $\phi_B$;

said system including at least one kinoform to provide said system with a kinoform power $\phi_K$;

said overall power of said system being the sum of said refractive power, $\phi_B$, and said kinoform power, $\phi_K$, said refractive power and said kinoform power changing with temperature, t, such that, at at least one operating wavelength for said system:

$$\frac{d\phi_T}{dt} = \frac{d\phi_R}{dt} + \frac{d\phi_K}{dt} = \text{constant}.$$

* * * * *